US012038723B2

(12) United States Patent
Jolidon et al.

(10) Patent No.: US 12,038,723 B2
(45) Date of Patent: Jul. 16, 2024

(54) SHOCK ABSORBER SPRING, BEARING BODY AND BEARING FOR TIMEPIECE

(71) Applicant: ROLEX SA, Geneva (CH)

(72) Inventors: Eric Jolidon, Gland (CH); Daniel Moille, Yvoire (FR)

(73) Assignee: ROLEX SA, Geneva (CH)

(*) Notice: Subject to any disclaimer, the term of this patent is extended or adjusted under 35 U.S.C. 154(b) by 488 days.

(21) Appl. No.: 17/327,965

(22) Filed: May 24, 2021

(65) Prior Publication Data

US 2021/0373498 A1 Dec. 2, 2021

(30) Foreign Application Priority Data

May 29, 2020 (EP) .................................... 20177619

(51) Int. Cl.
*G04B 31/02* (2006.01)

(52) U.S. Cl.
CPC .................................... *G04B 31/02* (2013.01)

(58) Field of Classification Search
CPC .. G04B 31/02; G04B 31/04; F16F 1/32; F16F 1/34
See application file for complete search history.

(56) References Cited

U.S. PATENT DOCUMENTS 2,538,142 A 1/1951 Zürcher
3,712,051 A * 1/1973 Romang ................ G04B 31/04 368/326
7,234,859 B2 6/2007 Kohler et al.
2006/0215499 A1 9/2006 Kohler et al.
2011/0222377 A1* 9/2011 Ching ................. G04B 17/222 368/175
2015/0198926 A1* 7/2015 Girardin ................ G04B 31/04 267/141
2016/0109854 A1 4/2016 Villar
2017/0261937 A1 9/2017 Merino

FOREIGN PATENT DOCUMENTS

| | | | |
|---|---|---|---|
| CH | 272618 | A | 12/1950 |
| CH | 705583 | A | 4/2013 |
| CH | 708733 | A2 | 4/2015 |
| EP | 1705537 | A1 | 9/2006 |
| EP | 3011396 | | 4/2016 |
| EP | 3070544 | A1 | 9/2016 |
| EP | 3220211 | A1 | 9/2017 |

(Continued)

OTHER PUBLICATIONS

Illustrated Professional Dictionary of Horology, "Movement," 1995.*

(Continued)

*Primary Examiner* — Renee S Luebke
*Assistant Examiner* — Matthew Hwang
(74) *Attorney, Agent, or Firm* — Seckel IP, PLLC

(57) ABSTRACT

A shock absorber spring (1) for a timepiece (200), extending substantially in a plane (P1) and having a first axis of symmetry (A1) perpendicular to the plane (P1), the spring including at least two first spring-fixing elements (11, 11', 11"), these first fixing elements each comprising at least a first fixing surface (11*a*, 11*b*, 11*a'*, 11*b'*, 11*a"*, 11*b"*) oriented at least substantially radially relative to the first axis (A1) and towards the first axis (A1).

20 Claims, 3 Drawing Sheets

(56) References Cited

FOREIGN PATENT DOCUMENTS

| | | | |
|---|---|---|---|
| FR | 909574 | A | 5/1946 |
| FR | 1532798 | A | 7/1968 |
| WO | 2014202418 | A2 | 12/2014 |

OTHER PUBLICATIONS

Illustrated Professional Dictionary of Horology, "Mechanism," 1961.*

European Search Report and Written Opinion dated Nov. 20, 2020 in priority application No. EP20177619; with English machine translation (total 15 pages).

* cited by examiner

SHOCK ABSORBER SPRING, BEARING BODY AND BEARING FOR TIMEPIECE

This application claims priority of European patent application No. EP20177619.2 filed May 29, 2020, the content of which is hereby incorporated by reference herein in its entirety.

The invention relates to a shock absorber spring for a timepiece. The invention relates to a bearing body for a timepiece. The invention relates to a bearing for a timepiece comprising such a shock absorber spring and/or such a bearing body. The invention also relates to a timepiece mechanism comprising such a shock absorber spring and/or such a bearing and/or such a bearing body. The invention also relates to a timepiece movement comprising such a shock absorber spring and/or such a bearing body and/or such a bearing and/or such a mechanism. The invention further relates to a timepiece comprising such a shock absorber spring and/or such a bearing body and/or such a bearing and/or such a mechanism and/or such a timepiece movement.

There are a great many shock absorber bearing solutions for timepieces, particularly those intended to pivot a balance staff. Such bearings usually comprise a bearing body, a holed bearing jewel, an endstone, a positioning ring for positioning the jewel and the endstone within the bearing body, and a spring arranged at the interface between the bearing body and the endstone, so as to damp the movement of the staff in the event of a shock that the timepiece might experience, and return the staff to its initial position after the shock.

The spring of the shock absorber bearing may for example be shaped into a closed loop. It then comprises pressing portions, in contact against the endstone, projecting toward the inside of the spring, and attachment portions projecting toward the outside of the spring so that these latter portions can be housed in an interior groove of the bearing body. By way of examples, documents CH705583, EP3011396, EP3220211 disclose various alternative embodiments of such a closed-loop spring.

Alternatively, the spring of the shock absorber bearing may have an open shape. In such instances, the spring has attachments in the form of lugs arranged at its ends and projecting toward the outside of said spring. By way of examples, documents EP1705537, CH708733, EP3070544 disclose various alternative embodiments of such an open-loop spring.

It is an object of the invention to provide a shock absorber spring and/or a bearing body and/or a bearing able to improve the devices known from the prior art. In particular, the invention proposes a shock absorber spring and/or a bearing body and/or a bearing able to minimize the stiffness of the spring and make the load applied to the endstone as constant as possible so as to adapt the mechanical response of the shock absorber bearing to the permissible stresses on the staff and, more particularly, on the pivots thereof, particularly in instances in which the materials are liable to be modified and/or the conventional dimensions of the staff are liable to be minimized.

A shock absorber spring according to the invention is defined by point 1 below.

1. A shock absorber spring for a timepiece, extending substantially in a plane and comprising a first axis of symmetry perpendicular to the plane, the spring comprising at least two first spring-fixing elements, these first fixing elements each comprising at least a first fixing surface oriented at least substantially radially relative to the first axis and towards the first axis.

Various embodiments of the spring are defined by points 2 to 5 below.

2. The spring as defined in the preceding point, wherein the spring has a shape having at least substantial symmetry of revolution of order n relative to the first axis, where n is a natural integer, notably where n=2 or n=3 or n=4 or n=5, and/or wherein the spring has the form of a closed loop closed on itself.
3. The spring as defined in one of the preceding points, wherein the spring comprises at least two pressing elements intended to press against an endstone element, and at least two connecting elements mechanically connecting the pressing elements to the first fixing elements.
4. The spring as defined in the preceding point, wherein at least a portion of the at least two connecting elements extend at least substantially radially relative to the first axis, and/or wherein at least a portion of the at least two connecting elements extend at least substantially orthoradially relative to the first axis.
5. The spring as defined in one of the preceding points, wherein the first fixing elements each comprise at least one lobe and wherein the first fixing surfaces are created on the lobes.

A shock absorber bearing body according to the invention is defined by point 6 below.

6. A bearing body comprising a second axis of symmetry and at least two second spring-fixing elements for fixing a spring, these second fixing elements each comprising at least one second fixing surface oriented at least substantially radially relative to the second axis and in a direction away from the second axis.

Various embodiments of the shock absorber bearing body are defined by points 7 to 9 below.

7. The bearing body as defined in point 6, wherein the bearing body has a shape having at least substantial symmetry of revolution of order n relative to the second axis, where n is a natural integer, notably where n=2 or n=3 or n=4 or n=5.
8. The bearing body as defined in one of points 6 and 7, wherein each second fixing element comprises a stud, the second fixing surfaces being created on the studs.
9. The bearing body as defined in point 8, wherein each stud comprises a groove extending at least substantially radially relative to the second axis.

A bearing according to the invention is defined by point 10 below.

10. A bearing comprising a bearing body as defined in one of points 6 to 9 and/or a spring as defined in one of points 1 to 5.

Various embodiments of the bearing are defined by points 11 and 12 below.

11. The bearing as defined in the preceding point, wherein it comprises an endstone element and/or a pivot element and/or a positioning ring for positioning the endstone element and/or the pivot element.
12. The bearing as defined in point 10 or 11, wherein the ratio:
    of the diameter of a larger cylinder inscribed between the first fixing surfaces, with the spring removed or in a free or unconstrained state, to
    a diameter of a smaller cylinder circumscribed on the second fixing surfaces,
    is less than 1 or less than 0.99 or less than 0.98.

A timepiece mechanism according to the invention is defined by point 13 below.

13. A timepiece mechanism, notably an oscillator of the balance wheel spiral spring type, comprising a bearing as defined in one of points 10 to 12 and/or a spring as defined in one of points 1 to 5 and/or a bearing body as defined in one of points 6 to 9.

A timepiece movement according to the invention is defined by point 14 below.

14. A timepiece movement comprising a bearing as defined in one of points 10 to 12 and/or a spring as defined in one of points 1 to 5 and/or a bearing body as defined in one of points 6 to 9 and/or a mechanism as defined in the preceding point.

A timepiece according to the invention is defined by point 15 below.

15. A timepiece, notably a wristwatch, comprising a movement as defined in the preceding point and/or a bearing as defined in one of points 10 to 12 and/or a spring as defined in one of points 1 to 5 and/or a bearing body as defined in one of points 6 to 9 and/or a mechanism as defined in point 13.

The appended drawings show, by way of example, one embodiment of a timepiece.

Figure 1:
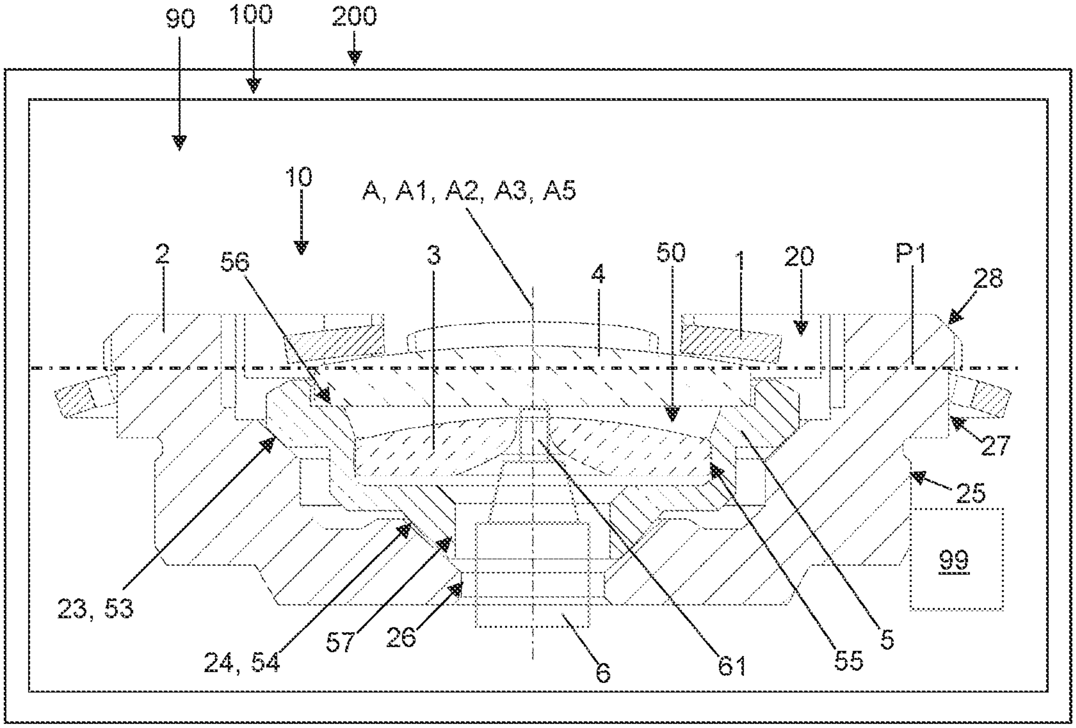
FIG. 1 depicts one embodiment of a timepiece.
Figure 2:
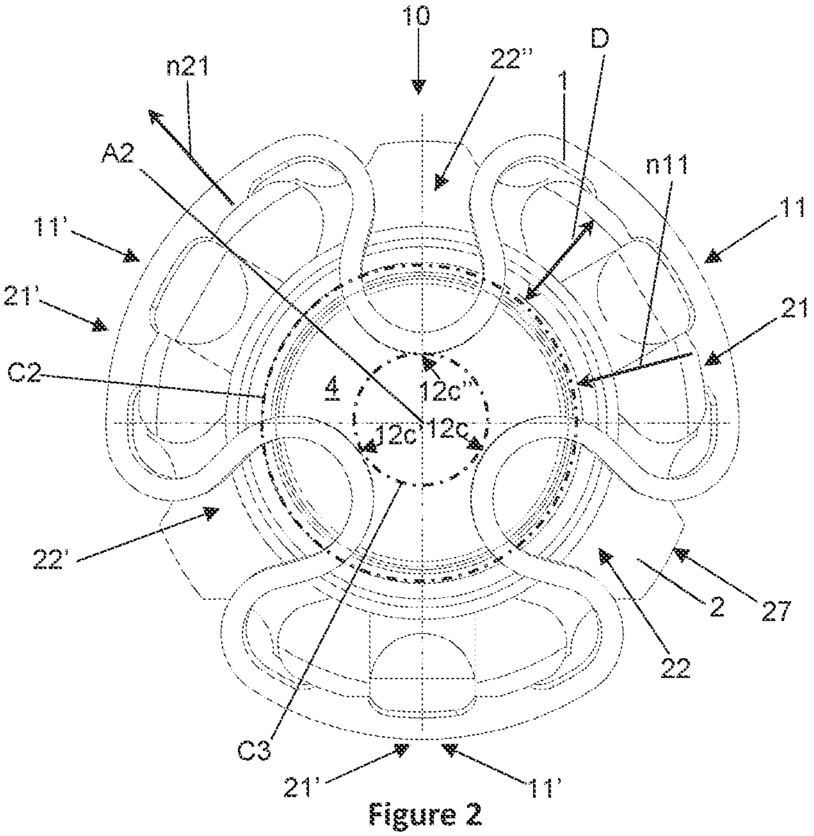
FIG. 2 is a detailed view from above of one embodiment of a bearing.

One embodiment of a timepiece 200 is described below with reference to FIGS. 1 to 5.

The timepiece 200 is for example a watch, in particular a wristwatch.

The timepiece 200 comprises a timepiece movement 100. The timepiece movement is intended to be mounted in a timepiece case in order to protect it from the external environment.

The timepiece movement 100 may be an electronic movement or a mechanical movement, in particular an automatic movement.

The timepiece movement comprises a timepiece mechanism 90.

The timepiece mechanism comprises a timepiece bearing 10. As a preference, the timepiece mechanism comprises two timepiece bearings 10 which are intended to guide an element 6 at the two ends thereof. The mechanism is, for example, a timepiece oscillator and comprises, for example, a balance wheel and a spiral spring. Alternatively, the mechanism is, for example, an oscillator in the form of a monolithic structure, namely an inertia element formed as one piece with one or more elastic return members. As a preference, the bearing is particularly suited to the pivoting of a staff, particularly a staff pivot, made of ceramic or of glass. This staff is, for example, a balance staff 6.

The timepiece bearing 10 comprises a shock absorber. The timepiece bearing 10 is therefore a shock absorber bearing or an elastic bearing. The bearing is able, for example, to guide in rotation, about an axis A, the balance wheel of an oscillator of the balance wheel spiral spring type. The bearing is also able, for example, to stop the translational movement, along the axis A, of the balance wheel, and notably to limit the translational movements of the balance wheel along the axis A. The balance wheel comprises a staff or shaft, particularly a balance staff 6.

The bearing comprises:

a bearing body 2 comprising a through-opening 20;

a pivot element 3, particularly a holed jewel 3, designed to pivot a staff 6, particularly a pivot 61 of the staff 6;

an endstone element 4, notably a jewel 4, designed to receive one end of the pivot 61 or to constitute a thrust bearing for one end of the pivot 61;

a positioning ring 5 for positioning the pivot element 3 and the endstone element 4 within the opening 20 of the bearing body 2;

a spring 1 solid with or fixed to the bearing body 2, and which is intended to elastically return and suitably reposition the elements 3, 4, 5 within the opening 20 of the bearing body 2 after a shock experienced by the timepiece 200, particularly by the movement 100.

These elements are more particularly visible in the cross-sectional view of FIG. 1.

As a preference, the bearing body 2, particularly the opening 20, has overall a geometry that has symmetry of revolution about an axis A2. As a preference, the ring 5 also has a geometry that has symmetry of revolution about an axis A5. Once the ring 5 is housed within the opening 20 of the bearing body 2, the axes A2 and A5 coincide or substantially coincide. To achieve this, the ring 5 comprises frustoconical or inclined surfaces 53, 54 staged along the axis A5 and which are intended to collaborate respectively with frustoconical or inclined surfaces 23, 24 staged within the opening 20 of the bearing, so as to center the ring 5 in the bearing body 2. This here is what is known as a “double cone” construction.

The ring 5 comprises a through-opening 50 intended to receive the elements 3 and 4. More particularly, the opening 50 comprises a surface 55 of revolution of axis A5, which is intended to receive the pivot element 3, and a surface 56 perpendicular to the axis A5, which is intended to receive the endstone element 4. The pivot element 3 is notably driven against the surface 55. The endstone element 4 is arranged with minimal clearance against a shoulder formed by the surface 56. The opening 50 further comprises a portion 57 intended for the passage of the staff 6. The same applies to the opening 20 of the bearing body 2, which likewise comprises a portion 26 for the passage of the staff 6.

Once the pivot element 3 has been assembled on the ring 5, the axis A3 of the pivot element 3 coincides or substantially coincides with the axis A5 of the ring 5.

In an alternative construction, the pivot element 3 could very well be manufactured as a single piece with the ring 5, so as to minimize the number of assembly operations within the bearing 10 and reduce the cumulative effects of dimensions and tolerances. Furthermore, the ring 5 could be guided differently within the bearing body 2. For example, the shock absorber could be of the “reverse double cone” type as in the example described in document FR1532798.

The shock absorber bearing 10 is designed to be assembled on a blank 99 of the movement 100. To do that, the body 2 comprises a portion 25 designed to be driven into the blank 99 of the movement 100. This blank may be a bridge, particularly a balance bridge, or a plate.

The function of the spring 1 is to return the elements 2, 3, 4 and 5 to their relative positions depicted in FIG. 1. Specifically, under the effect of shocks experienced by the timepiece, the balance wheel, particularly the staff 6, may move with respect to the rest of the movement and, in particular, with respect to the bearing body. It may move longitudinally relative to the axis A and/or radially relative to the axis A. The movements of the staff 6, and the elastic return of the spring 1 imply movements of the elements 3 and/or 4 and/or 5 relative to the body 2. The spring is able to return the elements to their positions once the shock is over.

The shock absorber spring 1 preferably extends substantially in a plane P1. The spring advantageously comprises a first axis of symmetry A1 perpendicular to the plane P1. The spring comprises at least two first spring-fixing elements 11, 11', 11" for fixing said spring. These first fixing elements each comprise at least a first fixing surface 11*a*, 11*b*, 11*a'*, 11*b'*, 11*a"*, 11*b"* oriented at least substantially radially relative to the first axis and towards the first axis. Specifically, the vectors n11 normal to the first fixing surfaces 11*a*, 11*b*, 11*a'*, 11*b'*, 11*a"*, 11*b"* extend substantially radially relative to the first axis A1. The normal vectors n11 may form an angle with the plane P1, notably an angle less than 20°, when the spring is mounted on the bearing body.

Figure 4:
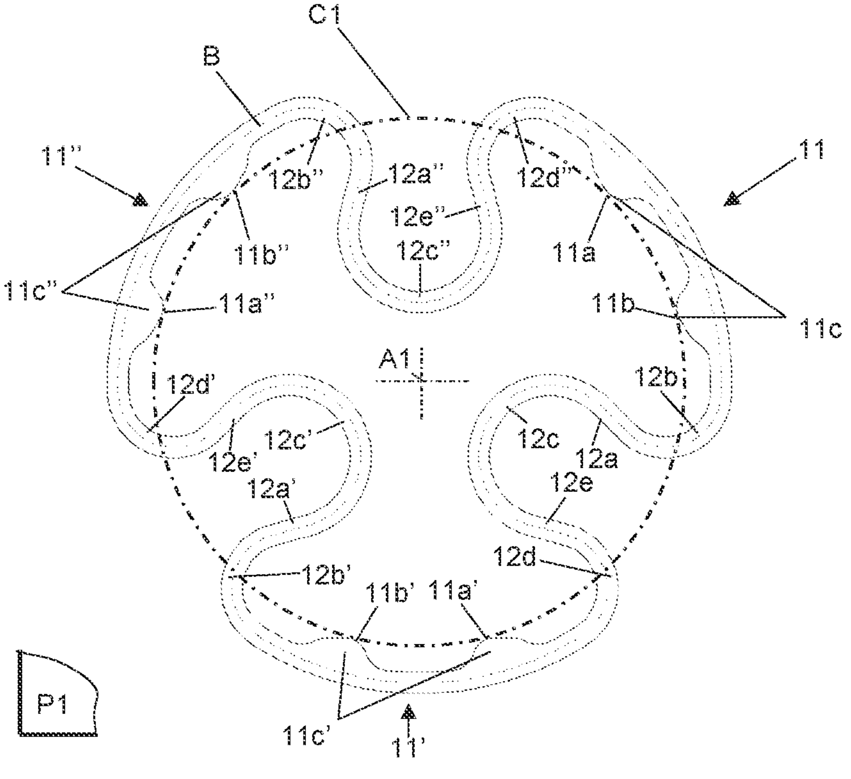
FIG. 4 is a detailed view from above of one embodiment of a spring.

Advantageously, the first fixing surfaces may extend perpendicular or substantially perpendicular to the plane P1 when the spring is in its free state, namely in a state that is not preloaded as depicted in FIG. 4. Advantageously, the first surfaces may extend perpendicular or substantially perpendicular to the plane P1 when the spring is in its constrained state, namely in a preloaded state in which it is mounted on the bearing body.

The first fixing elements 11, 11', 11" extend at least substantially orthoradially relative to the axis A1.

In addition to the first fixing elements 11, 11', 11", the spring comprises:

- at least two pressing elements 12*c*, 12*c'*, 12*c"* intended to press against the endstone element 4, and
- at least two connecting elements 12*a*, 12*b*, 12*d*, 12*e*, 12*a'*, 12*b'*, 12*d'*, 12*e'*, 12*a"*, 12*b"*, 12*d"*, 12*e"* mechanically connecting the pressing elements to the first fixing elements.

For example, the connecting elements are distinguished from the fixing elements by a boundary consisting of a cylindrical surface C1 tangential to the first fixing surfaces (the spring being in its free state or in its constrained state, mounted on the bearing body).

For example, the connecting elements are distinguished from the pressing elements by a boundary consisting of a cylindrical surface C2 centered on the axis A1 or A2 or A3 and having the same diameter or substantially the same diameter as the outside diameter of the endstone element or having the same diameter or substantially the same diameter as the outside diameter of the pivot element. Alternatively, the diameter of the cylindrical surface C2 may be less than the outside diameter of the endstone element or than the outside diameter of the pivot element. Such a configuration would make it possible to maximize the length of the connecting elements.

The function of the fixing elements is to fix the spring to the bearing body, and in particular to fix said fixing elements of the spring to the bearing body. This fixing may notably be achieved by relative friction between said fixing elements of the spring, and the bearing body. What is preferably meant by "fixing" is a complete connection or a built-in connection, namely a connection that allows no degree of freedom between the fixing elements of the spring and the fixing elements of the bearing body.

The function of the pressing elements is to apply to the endstone element and/or to the pivot element a return force able to return the endstone element and/or the pivot element to a predefined position, notably a predefined and optimal position for guiding the element 6. As a preference, the pressing elements are defined as the expanses of the spring with which the endstone element can come into contact when the endstone element is in its predefined position and/or when the endstone element is in a position that stresses the spring as the result of a shock.

The spring preferably has a main structure in the form of a closed loop closed on itself. The spring may notably have the shape of a closed loop closed on itself. This closed loop is preferably centered on the axis A1. The spring is thus, for example, formed of a single wire closed on itself. The wire may have a cross section the geometry of which remains constant or changes along the length of the wire. As an alternative, the loop may have a cut or an opening, which is to say that the wire that forms the loop has two ends, one on each side of the cut. The wire may notably have a cross section of rectangular shape or of square shape.

What is preferably meant by "loop" is a filamentary geometry without branching or forking. As a preference, such a filamentary geometry does not intersect the axis A1 and/or does not cross a boundary zone delimited by a cylindrical surface C3 centered on the axis A1, the diameter of the cylindrical surface C3 preferably being less than 0.8 times the diameter of the cylindrical surface C2, or even less than 0.6 times the diameter of the cylindrical surface C2. As a preference, the entirety of the loop can be described by a curve B (indicated in FIG. 4) that can be described by a curvilinear abscissa, without backtracking. As a preference, any point on this curve B may travel the entirety of this same curve in one and only one path in a given direction, without backtracking, from a starting point positioned on the curve. As a preference, this curve is continuous. As a preference, the length of such a curve B is greater than at least three times the diameter of the cylindrical surface C1, or even greater than at least four times the diameter of the cylindrical surface C1, or even greater than at least five times the diameter of the cylindrical surface C1.

The spring is preferably made of steel, in particular of Durnico steel, or of Phytime or else of Phynox. Alternatively, the spring may be made of an at least partially amorphous metal alloy. Alternatively, the spring may be made of nickel or else of a nickel-phosphorus alloy, notably using a technology of Liga type.

As a preference, at least a portion 12*a*, 12*e*, 12*a'*, 12*e'*, 12*a"*, 12*e"* of the at least two connecting elements extend at least substantially radially relative to the first axis A1.

As a preference, at least a portion 12*b*, 12*d*, 12*b'*, 12*d'*, 12*b"*, 12*d"* of the at least two connecting elements extend at least substantially orthoradially relative to the first axis A1.

As a preference, the at least two pressing elements have a geometry that is convex when viewed from the inside of the spring, notably from the first axis A1. As a preference, they each have angular expanses about the axis A1 that are comprised between 45° and 90° (notably when the spring has order-3 rotational symmetry). As a preference, more generally, when the spring has order-n rotational symmetry, each pressing element has an angular expanse about the axis A1 that is comprised between 270°/2n and 270°/n.

As a preference, the at least two pressing elements each have radial expanses relative to the axis A1 that are comprised between 0.25 times and 0.75 times the outside radius of the endstone element 4, against which endstone element said spring 1 is intended to press.

Each pressing element preferably consists mainly of a curved portion, notably a portion of a circle 12*c*, 12*c'*, 12*c"*.

Each connecting element preferably consists mainly of:

- a first curved portion, notably a first portion of a circle 12*b*, 12*b'*, 12*b"*, and a first straight portion 12*a*, 12*a'*, 12*a"* connecting a first fixing element to a first pressing element, and a second curved portion, notably a second portion of a circle 12*d*, 12*d*', 12*d*", and a second straight portion 12*e*, 12*e*', 12*e*" connecting a second fixing element to the relevant first pressing element.

The circle portions 12*b*, 12*b*', 12*b*", 12*d*, 12*d*', 12*d*" are convex when viewed from the outside of the spring in the plane P1.

As a preference, the at least two fixing elements extend at least substantially orthoradially relative to the first axis A1.

Each fixing element preferably consists mainly of a curved portion, notably a portion of a circle. These portions are convex when viewed from the outside of the spring in the plane P1.

As a preference, the spring has a shape having at least substantial rotational symmetry of order n or symmetry of revolution of order n relative to the first axis A1, where n is a natural integer, notably where n=2 or n=3 or n=4 or n=5. In the embodiment depicted, n=3, which means to say that the spring has a three-lobed geometry.

As a preference, the distance D, measured radially, separating the first fixing surfaces and the pressing elements is greater than 0.2 times the radius of the cylindrical surface C1, or even greater than 0.3 times the radius of the cylinder C1. As a preference, the distance D, measured radially, separating the first fixing surfaces and the pressing elements is less than 0.6 times the radius of the cylindrical surface C1, or less than 0.5 times the radius of the cylindrical surface C1.

As a preference, the first fixing surfaces are substantially positioned on the cylindrical surface C1 having a diameter equal to at least 1.5 times or to at least 1.7 times the outside diameter of the endstone element 4, against which endstone element the spring is intended to press.

As a preference, these dimensions are established for a spring not positioned or not mounted on a bearing body, namely for a spring that is not stressed or is unconstrained.

Advantageously, the first fixing elements each comprise at least one lobe 11*c*, 11*c*', 11*c*". The first fixing surfaces are preferably created on the lobes. The lobes project toward the inside of the spring, namely they extend towards the inside of the spring. In the embodiment depicted, each first fixing element comprises two lobes.

As a preference, the fixing elements 11, 11', 11" are equally distributed about the axis A1 of the spring and are identical. As a preference, the pressing elements 12*c*, 12*c*', 12*c*" are equally distributed about the axis A1 of the spring and are identical. As a preference, the connecting elements 12*a*, 12*b*, 12*d*, 12*e*, 12*a*', 12*b*', 12*d*', 12*e*', 12*a*", 12*b*", 12*d*", 12*e*" are equally distributed about the axis A1 of the spring and are identical.

In the embodiment depicted, the spring comprises:

three fixing elements, three pressing elements, and three connecting elements.

The bearing body 2 comprises a second axis of symmetry A2 and at least two second spring-fixing elements 21, 21', 21" for fixing the spring 1. These second fixing elements each comprise at least a second fixing surface 21*c*, 21*c*', 21*c*" oriented at least substantially radially relative to the second axis and in a direction away from the second axis A2. Specifically, the vectors n21 normal to the second fixing surfaces 21*c*, 21*c*', 21*c*" extend substantially radially relative to the second axis A2 and emerge from these fixing surfaces in a direction away from the second axis A2. In particular, the fixing surfaces 21*c*, 21*c*', 21*c*" are oriented toward the outside of the bearing body 2.

The second fixing elements are arranged in such a way as to collaborate with the first fixing elements in order to fix the spring to the bearing body. In particular, the second fixing surfaces are arranged in such a way as to collaborate with the first fixing surfaces in order to fix the spring to the bearing body. More particularly, the forces of contact between the first and second fixing surfaces have the same orientations or substantially the same orientations as those of the vectors n11 and n12, give or take the coefficient of friction between the first and second fixing surfaces. Thus, the first fixing surface applies a force against the second surface which is oriented or substantially oriented along the vector n11. A reaction force from the second surface toward the first surface is itself oriented or substantially oriented along the vector n12.

The second fixing elements are respectively provided with studs or teeth or crenellations 21, 21', 21" extending mainly parallel to the axis A2. These studs project toward the outside of the bearing body from a peripheral surface 27 of the bearing body, in a direction radial to the axis A2 of the bearing body.

As a preference, the bearing body has a shape having at least substantial rotational symmetry of order n or symmetry of revolution of order n relative to the second axis A2, where n is a natural integer, notably where n=2 or n=3 or n=4 or n=5. In the embodiment depicted, n=3. As a preference, the second fixing elements 21, 21', 21" are equally distributed about the axis A2 of the bearing body 2 and are identical. The studs 21, 21', 21" are separated by openings or gaps 22, 22', 22" at the surface 27 of the bearing body.

Each stud 21, 21', 21" comprises a second fixing surface 21*c*, 21*c*', 21*c*". Each second fixing surface extends at the peripheral surface 27 of the bearing body. For example, these second fixing surfaces 21*c*, 21*c*', 21*c*" take the form of flat spots oriented radially relative to the axis A2 and extending orthoradially relative to the axis A2.

Once the spring 1 has been assembled on the bearing body 2, the lobes 11*c*, 11*c*', 11*c*" press respectively against the flat spots 21*c*, 21*c*', 21*c*". In this configuration, the first fixing elements 11, 11', 11" of the spring 1 are positioned and held at the exterior periphery of the second fixing elements 21, 21', 21", particularly at the exterior periphery of the second fixing surfaces 21*c*, 21*c*', 21*c*".

In other words, when the spring 1 is assembled on the bearing body 2, the first fixing elements 11, 11', 11" of the spring 1 are further away from the axis A1 or A2 than are the second fixing elements 21, 21', 21" of the bearing body 2, particularly the surfaces 21*c*, 21*c*', 21*c*", in a direction that is radial relative to one or the other of these axes.

Advantageously, the ratio:

of the diameter of a larger cylinder inscribed between the first fixing surfaces and tangential to these first surfaces (with the spring removed or in a free or unconstrained state), to a diameter of a smaller cylinder circumscribed on the second fixing surfaces, is less than 1 or less than 0.99 or less than 0.98.

As a preference, each stud comprises two half-studs 21*a*, 21*b*, 21*a*', 21*b*', 21*a*", 21*b*". The half-studs of the one same stud are separated from one another by a groove 21*e*, 21*e*', 21*e*" extending at least substantially radially relative to the second axis A2. Thus, each first fixing element 11, 11', 11" of the spring 1 comprises a pair of lobes 11*c*, 11*c*', 11*c*" collaborating with a pair of half-studs 21*a*, 21*b*, 21*a*', 21*b*', 21*a*", 21*b*" of a second fixing element 21, 21', 21" of the bearing body 2.

The configuration of the lobes and of the flat spots allows the spring 1 to be prestressed in such a way that it can be held angularly relative to the axis A2 of the bearing body 2.

Furthermore, each half-stud 21*a*, 21*b*, 21*a*', 21*b*', 21*a*", 21*b*" comprises a shoulder 210*a*, 210*b*, 210*a*', 210*b*', 210*a*", 210*b*", namely a surface extending perpendicular or substantially perpendicular to the axis A2. Such a configuration of the studs thus allows axial retention of the pairs of lobes 11*c*, 11*c*', 11*c*" of the spring.

Figure 5:
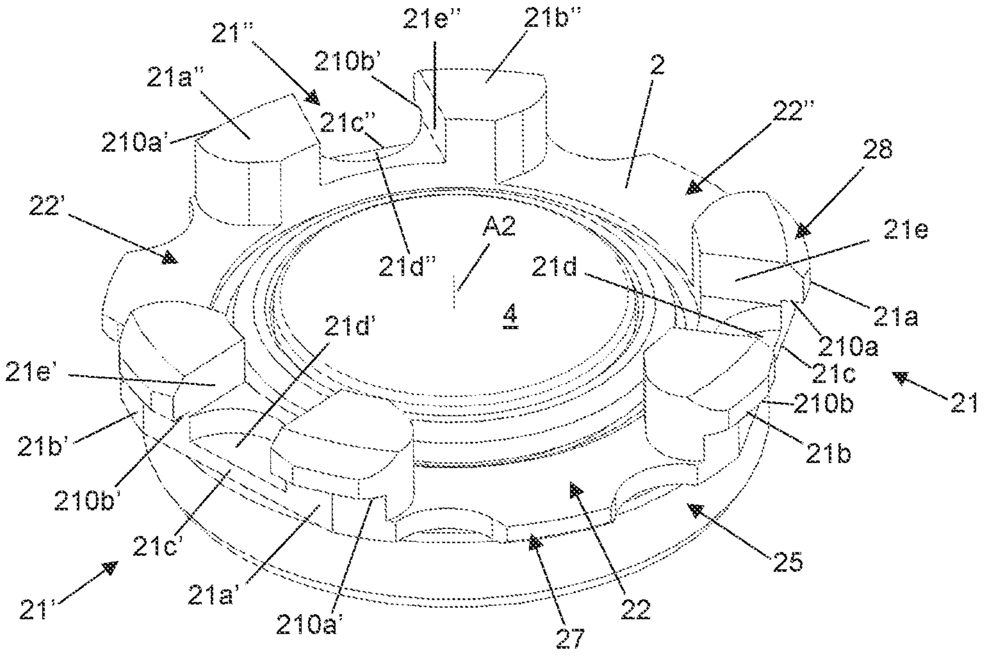
FIG. 5 is a detailed view in perspective of one embodiment of the bearing body.

In the specific embodiment of bearing body 2 that is illustrated in the figures, particularly FIG. 5, the flat spots 21*c*, 21*c*', 21*c*" are formed at the peripheral surface 27 of the bearing body 2, so that the first fixing elements 11, 11', 11" of the spring 1 (once in place on the bearing body) "overhang" around the bearing body 2. In other words, the first fixing elements 11, 11', 11" of the spring 1 are positioned and held at the exterior periphery of the bearing body 2.

Of course, it is entirely possible to configure the bearing body 2 in such a way that it has a portion of which the dimensions, particularly the diameter, allow the spring 1 to be fully contained, when the bearing 10 is viewed from above.

The connecting elements 12*a*, 12*b*, 12*d*, 12*e*, 12*a*', 12*b*', 12*d*', 12*e*', 12*a*", 12*b*", 12*d*", 12*e*" of the spring 1 are themselves intended to become housed respectively in the openings or gaps 22, 22', 22" of the bearing body 2 which are provided between the studs. As was seen earlier, each of these connecting elements takes the form of two elastic blades 12*a*, 12*b*, 12*d*, 12*e*, 12*a*', 12*b*', 12*d*', 12*e*', 12*a*", 12*b*", 12*d*", 12*e*" comprising several substantially straight and curved parts.

Because of the way in which the first fixing elements of the spring are arranged, on the outside of the second fixing elements of the bearing body, the active length of the elastic blades can be maximized. To do this, each elastic leaf may comprise, at one and/or the other of its ends, curved parts 12*b*, 12*d*, 12*b*', 12*d*', and 12*b*", 12*d*" which allow the active length of each of the blades to be maximized.

In the specific embodiment of spring depicted in the figures, the elastic blades have a cross section that is constant. The first fixing elements have substantially the same cross section as that of the elastic blades, with the notable exception of the zones within which the lobes extend. Thus, the boundaries between the first fixing elements and the connecting elements can be determined by the presence or absence of lobes. Nevertheless, the first fixing elements may be devoid of lobes. In such an instance, the first fixing elements may have substantially the same cross section as the connecting elements. Alternatively, the lobes may be replaced by notches designed to collaborate with projections formed on each of the studs of the bearing body.

Figure 3:
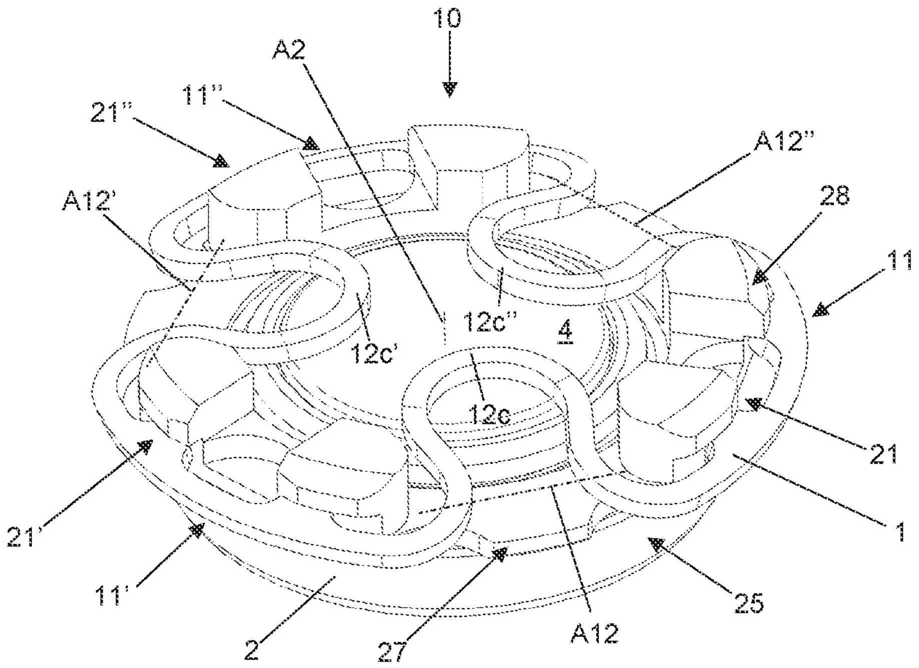
FIG. 3 is a detailed view in perspective of the embodiment of the bearing.

Once the spring 1 has been mounted on the bearing body 2, the pressing elements 12*c*, 12*c*', 12*c*" are in contact with the endstone element 4 and apply to it an essentially axial return force which is notably determined by the level of preload in the spring 1, this being defined in particular by the overall configuration of the spring and in particular by the configurations of the first and second fixing elements of the spring and of the bearing body respectively. This is made possible by the mobility of the pressing elements and of the connecting elements with respect to the first fixing elements 11, 11', 11". More particularly, the configuration of the spring, particularly of the blades 12*a*, 12*b*, 12*d*, 12*e*, 12*a*', 12*b*', 12*d*', 12*e*', 12*a*", 12*b*", 12*d*", 12*e*" allows, through elastic deformation of the spring, a substantially rotational movement of the connecting elements and of the pressing elements about an axis A12, A12', A12" that is at least substantially orthoradial to the axes A1 and A2 and that extends at the interfaces between the fixing elements and the connecting elements. These axes A12, A12', A12" are depicted in FIG. 3. The pressing elements 12*c*, 12*c*', 12*c*" are thus able to move outside of a plane passing through the first fixing elements 11, 11', 11".

When the element 6 or a pivot 61 of the element 6 experiences a shock, each pressing element and each connecting element of the spring 1 is thus able to supply a force of elastic return against the elements 3, 4, 5 within the bearing body 2, and to do so thanks to the mobility of the pressing elements and of the connecting elements with respect to the first fixing elements.

The active length of the elastic blades 12*a*, 12*b*, 12*d*, 12*e*, 12*a*', 12*b*', 12*d*', 12*e*', 12*a*", 12*b*", 12*d*", 12*e*" combined with the cross section of the elastic blades make it possible to minimize the stiffness of the spring 1 with respect to the dimensions of the bearing body 2 and notably the dimension or the diameter over which the second fixing surfaces 21*c*, 21*c*', 21*c*" extend.

Moreover, the elastic blades 12*a*, 12*b*, 12*d*, 12*e*, 12*a*', 12*b*', 12*d*', 12*e*', 12*a*", 12*b*", 12*d*", 12*e*" may comprise more curved parts so as to maximize their active length.

The bearing body 2 advantageously comprises means for mounting the spring 1 within it. It notably comprises a chamfer 28 at each of the ends of the studs or half-studs to facilitate the passing of the first fixing elements under the shoulders 210*a*, 210*b*, 210*a*', 210*b*', 210*a*", 210*b*" of each of the studs or half-studs.

The bearing body 2 advantageously comprises means 21*d*, 21*d*', 21*d*" for manipulating the spring. These means comprise millings 21*d*, 21*d*', 21*d*" allowing the insertion of a tool intended for manipulating the spring in the region of its first fixing elements, particularly between each of the lobes provided on the first fixing elements.

Of course, it is entirely possible to provide one single solitary lobe for each first fixing element of the spring. The same is true regarding the second fixing elements of the bearing body, which could each comprise one single solitary solid stud rather than two half-studs.

In one particular design of bearing 10, the assembly of the spring on the bearing body could be of "bayonet" type. In a first angular position of the spring relative to the bearing body, determined by the axis A1 or A2, the spring could be detached from the bearing body, whereas in a second angular position of the spring relative to the bearing body, determined by the axis A1 or A2, the spring could be secured to the bearing body.

For preference, the blades 12*a*, 12*b*, 12*d*, 12*e*, 12*a*', 12*b*', 12*d*', 12*e*', 12*a*", 12*b*", 12*d*", 12*e*" have a cross section of which the height measured parallel to the axis A1 is greater than the width measured in a plane perpendicular to the axis A1. Alternatively, the blades 12*a*, 12*b*, 12*d*, 12*e*, 12*a*', 12*b*', 12*d*', 12*e*', 12*a*", 12*b*", 12*d*", 12*e*" have a cross section of which the height measured parallel to the axis A1 is smaller than the width measured in a plane perpendicular to the axis A1.

As a preference, the second fixing surfaces are substantially positioned on a cylindrical surface having a diameter equal to at least 1.5 times or to at least 1.6 times or to at least 1.8 times the outside diameter of an endstone element 4, against which endstone element said spring 1 is intended to press.

The solutions described above make it possible to minimize the stiffness of the spring notably for a given cross section and a given material of said spring. In particular, thanks to the solutions described, the stiffness of the spring may be less than 4 N/mm or less than 3 N/mm. In order to achieve this, a specific configuration of spring comprises elastic portions in the form of blades, of which the active lengths are maximized, for a given size of bearing body. The blades have the particular feature of extending both inside the bearing body and outside the bearing body. This is made possible by the fact that the blades adjoin first fixing elements of the spring, which are positioned on the outside of second fixing elements arranged, for example, at the exterior periphery of the bearing body. In particular, the first fixing elements of the spring extend at least substantially orthoradially relative to the axis of the spring or of the bearing body, on the outside of second fixing elements of the bearing body.

In particular, the solution relates to a spring comprising at least two elastic portions extending at least substantially radially relative to the axis of the spring or of the bearing body and which are formed, on either side, in the continuity of first attachment or fixing portions extending at least substantially orthoradially relative to the axis of the spring or of the bearing body and extending on the outside of second attachment or fixing portions of the shock absorber body.

Such a solution of shock absorber bearing has the advantage of offering a mechanical response that is optimized for a given geometry and/or a given material of balance staff. The stiffness of such a spring may notably be minimized and rendered as constant as possible whatever the movement of the staff. Finally, the fitting/removal of such a spring within the bearing body is particularly simple, facilitating assembly schedules and the after-sales service operations concerning such a shock absorber bearing.

Throughout this document, the orientation of a surface of a solid element is defined as being the orientation of a vector normal to this surface, the normal vector emerging from the solid element at this surface.

Throughout this document, a “fixing surface” preferably means a surface on which there is permanent contact between spring and bearing body when the spring is mounted on the bearing body and for as long as the spring is mounted on the bearing body. When the spring is removed, this contact is broken.

Throughout this document, “at least substantially perpendicular” means “perpendicular or substantially perpendicular”.

Throughout this document, “at least substantially parallel” means “parallel or substantially parallel”.

Throughout this document, “at least substantially radially” means “radially or substantially radially”.

Throughout this document, “at least substantially orthoradially” means “orthoradially or substantially orthoradially”.

The invention claimed is:

1. A shock absorber spring for a timepiece, extending substantially in a plane and comprising a first axis of symmetry perpendicular to the plane, the spring comprising:
at least two first spring-fixing elements,
wherein each of the first fixing elements comprises at least one first fixing surface oriented at least substantially radially relative to the first axis and towards the first axis, wherein the at least one first fixing surface is on a lobe projecting toward the first axis relative to respective adjacent surfaces also oriented at least substantially radially relative to the first axis and towards the first axis, the adjacent surfaces being respectively located on either side of the at least one first fixing surface along an orthoradial direction relative to the first axis.

2. The spring as claimed in claim 1, wherein the spring has a shape having at least substantial symmetry of revolution of order n relative to the first axis, where n is a natural integer.

3. The spring as claimed in claim 1, wherein the spring comprises at least two pressing elements adapted to press against an endstone element, and at least two connecting elements mechanically connecting the pressing elements to the first fixing elements.

4. The spring as claimed in claim 3, wherein at least a portion of each of the at least two connecting elements extends at least substantially radially relative to the first axis.

5. The spring as claimed in claim 3, wherein at least a portion of each of the at least two connecting elements extends at least substantially orthoradially relative to the first axis.

6. The spring as claimed in claim 1, wherein each of the first fixing elements comprises at least one lobe, and wherein the first fixing surfaces are created on the lobes.

7. The spring as claimed in claim 1, wherein the spring has a shape having at least substantial symmetry of revolution of order n relative to the first axis, where n is a natural integer and n=2 or n=3 or n=4 or n=5.

8. The spring as claimed in claim 1, wherein the spring has the form of a closed loop closed on itself.

9. A bearing body having a second axis of symmetry, the bearing body comprising:
at least two second spring-fixing elements for fixing a spring,
wherein each of the second spring-fixing elements comprises at least one second fixing surface oriented at least substantially radially relative to the second axis and in a direction away from the second axis,
wherein each of the second fixing elements comprises a stud, the second fixing surfaces being created on the studs.

10. The bearing body as claimed in claim 9, wherein the bearing body has a shape having at least substantial symmetry of revolution of order n relative to the second axis, where n is a natural integer.

11. The bearing body as claimed in claim 9, wherein each of the studs comprises a groove extending at least substantially radially relative to the second axis.

12. A bearing comprising a bearing body as claimed in claim 9 and a shock-absorber spring.

13. The bearing as claimed in claim 12, wherein the bearing comprises at least one of the following:
an endstone element,
a pivot element,
a positioning ring adapted for positioning an endstone element, a pivot element, or both an endstone element and a pivot element.

14. The bearing as claimed in claim 12, wherein a ratio:
of a first diameter of a larger cylinder inscribed between first fixing surfaces of the spring, with the spring removed or in a free or unconstrained state,
to a second diameter of a smaller cylinder circumscribed on the second fixing surfaces of the bearing body,
is less than 1.

15. A timepiece mechanism comprising a bearing as claimed in claim 12.

16. A timepiece mechanism as claimed in claim 15, wherein the timepiece mechanism comprises an oscillator comprising a balance wheel and a spiral spring.

17. A timepiece movement comprising a bearing as claimed in claim 12.

18. A timepiece comprising a movement as claimed in claim 17.

19. The bearing as claimed in claim 12, wherein the shock absorber spring extends substantially in a plane and comprising a first axis of symmetry perpendicular to the plane, the spring comprising:

at least two first spring-fixing elements, wherein each of the first fixing elements comprises at least one first fixing surface oriented at least substantially radially relative to the first axis and towards the first axis, wherein the at least one first fixing surface is on a lobe projecting toward the first axis relative to respective adjacent surfaces also oriented at least substantially radially relative to the first axis and towards the first axis, the adjacent surfaces being respectively located on either side of the at least one first fixing surface along an orthoradial direction relative to the first axis.

20. The bearing body as claimed in claim 9, wherein the bearing body has a shape having at least substantial symmetry of revolution of order n relative to the second axis, where n is a natural integer and n=2 or n=3 or n=4 or n=5.

* * * * *